United States Patent [19]
Lee

[11] Patent Number: 5,659,463
[45] Date of Patent: Aug. 19, 1997

[54] HIGH-EFFICIENCY SUMMING POWER CONVERTER AND METHOD THEREFOR

[75] Inventor: James Lee, Monterey Park, Calif.

[73] Assignee: Hughes Electronics, Los Angeles, Calif.

[21] Appl. No.: 615,925

[22] Filed: Mar. 14, 1996

[51] Int. Cl.$^6$ .............................. H02M 3/335; G05F 1/56
[52] U.S. Cl. .............................................. 363/25; 323/282
[58] Field of Search .............................. 363/22, 23, 24, 363/25; 323/282, 285, 286, 287

[56] References Cited

U.S. PATENT DOCUMENTS

| | | | |
|---|---|---|---|
| 3,873,903 | 3/1975 | Koetsch et al. | 363/25 |
| 5,067,066 | 11/1991 | Chida | 363/16 |
| 5,128,603 | 7/1992 | Wolfel | 323/282 |
| 5,422,562 | 6/1995 | Mammano et al. | 323/282 |

*Primary Examiner*—Matthew V. Nguyen
*Attorney, Agent, or Firm*—Phyllis Y. Price; Terje Gudmestad; Wanda K. Denson-Low

[57] ABSTRACT

A power converter for converting an input signal having an input DC voltage level to an output signal having a desired output DC voltage level. The power converter includes a switching converter having an input which receives the input signal and a floating differential output which includes a first output and a second output. The switching converter is operative to convert the input signal to an offset voltage equal to a difference between the desired output DC voltage level and the input DC voltage level. The offset voltage is generated across the first output and the second output of the floating differential output. The input signal is applied to the second output of the floating differential output to sum the input DC voltage level with the offset voltage and thereby produce the desired output voltage level at the first output.

14 Claims, 2 Drawing Sheets

HIGH-EFFICIENCY SUMMING POWER CONVERTER AND METHOD THEREFOR

TECHNICAL FIELD

This invention was made with Government support under N00039-88-C-0300 awarded by the Department of the Navy. The Government has certain rights in this invention.

The present invention relates to electrical power converters, and more specifically, to DC-to-DC power converters.

BACKGROUND ART

An electric power converter is an apparatus which converts electric power from one form into another form. Classes of electric power converters include AC-to-DC converters, AC-to-AC converters, DC-to-AC converters, and DC-to-DC converters.

DC-to-DC power converters are utilized in many applications to regulate an input source having a variable DC voltage level to produce an output at a predetermined DC voltage level. DC-to-DC power converters can be simultaneously utilized to step-up or step-down the voltage level of the input source, i.e. to produce an output DC voltage level which is greater or less than or equal to the input DC voltage level. In some satellite and spacecraft applications, for example, a DC-to-DC power converter is utilized to step-down a bus voltage which varies between 51.55 VDC to 51.35 VDC to produce a constant 65 VDC signal.

For these applications, the DC-to-DC power converter can include a linear regulator having an output set close to the minimum bus voltage, e.g. 51.35 V, to minimize power loss. However, for high bus voltages, the power loss in the regulator is high and hence the overall efficiency is decreased. In order to maintain efficiency at various bus voltages, the DC-to-DC power converter can comprise a switching regulator. However, switching regulators are typically not as efficient as linear regulators for low bus voltages.

SUMMARY OF THE INVENTION

It is an object of the present invention to provide a DC-to-DC converter having a high efficiency throughout a range of input voltage levels.

A further object of the present invention is to reduce a physical dimension and/or a mass of a DC-to-DC converter for producing a desired output voltage.

In carrying out the above objects, the present invention provides a power converter for converting an input signal having a first DC voltage level to an output signal having a second DC voltage level. The power converter includes a switching converter having an input which receives the input signal and a floating differential output which includes a first output and a second output. The switching converter is operative to convert the input signal to an offset voltage equal to a difference between the second DC voltage level and the first DC voltage level. The offset voltage is generated across the first output and the second output of the floating differential output. The input signal is applied to the second output of the floating differential output to sum the first DC voltage level with the offset voltage and thereby produce the output signal at the first output.

Further in carrying out the above objects, the present invention provides a method of converting an input signal having a first DC voltage level to an output signal having a second DC voltage level. The method comprises a step of providing a switching converter having an input which receives the input signal and a floating differential output which includes a first output and a second output. The method further comprises a step of converting the input signal, using the switching converter, to an offset voltage equal to a difference between the second DC voltage level and the first DC voltage level, the offset voltage being generated across the first output and the second output of the floating differential output. A step of applying the input signal to the second output of the floating differential output is performed to sum the first DC voltage level with the offset voltage and thereby produce the output signal at the first output.

These and other features, aspects, and embodiments of the present invention will become better understood with regard to the following description, appended claims, and accompanying drawings.

BEST MODE FOR CARRYING OUT THE INVENTION

Figure 1:
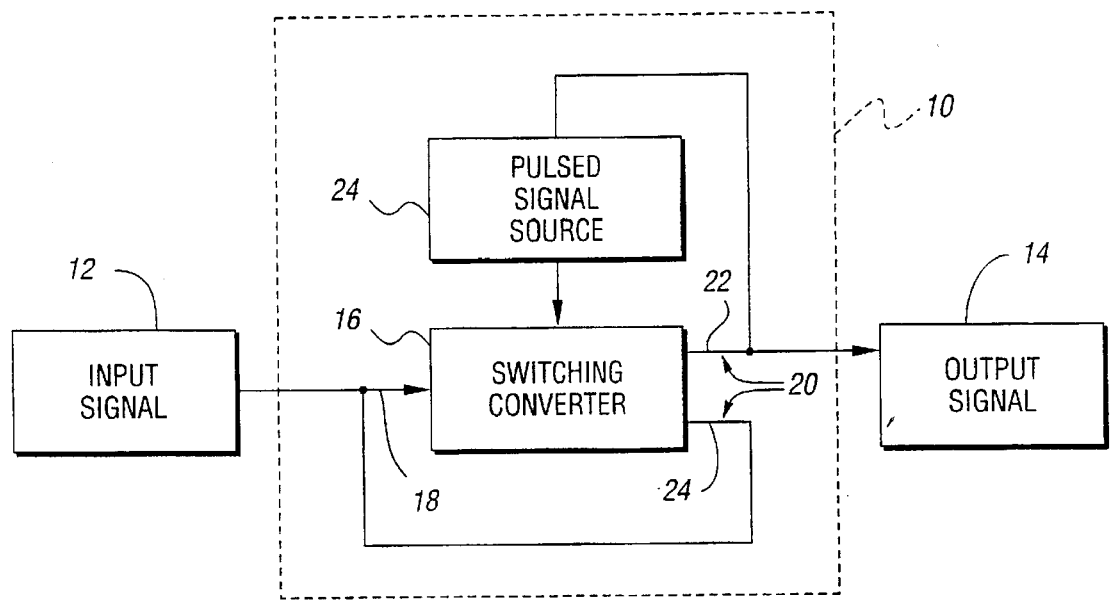
FIG. 1 is a block diagram of an embodiment of a step-up power converter in accordance with the present invention.

FIG. 1 is a block diagram of an embodiment of a step-up power converter 10 in accordance with the present invention. The step-up power converter 10 is utilized to step-up an input signal 12 having an input DC voltage level to an output signal 14 having a desired output DC voltage level. Since the power converter 10 is a step-up converter, the desired output DC voltage level is greater than or equal to the input DC voltage level.

The step-up power converter 10 includes a switching converter 16 having an input 18 which receives the input signal 12, and a floating differential output 20 which includes a first output 22 and a second output 24. To provide the floating differential output 20, the switching converter 16 utilizes a transformer to isolate the input 18 from the differential output 20. Here, the input 18 is coupled to one winding of the transformer, and the first output 22 and the second output 24 are coupled to another winding. In a preferred embodiment, the switching converter 16 has a push-pull converter topology. However, alternative embodiments can utilize any type of isolated converter including, but not limited to, a half-bridge converter, a full-bridge converter, a flyback converter, or a forward converter.

The switching converter 16 is operative to convert the input signal 12 to an offset voltage equal to a difference between the desired output DC voltage level and the input DC voltage level. The offset voltage is generated across the first output 22 and the second output 24 of the floating differential output 20.

The input signal 12 is applied to the second output 24 of the floating differential output. As a result, the voltage at the first output 22 is a sum of the input DC voltage level and the offset voltage. Hence, the voltage at the first output 22 is equal to the desired output DC voltage level.

The output DC voltage level at the first output 22 is regulated using a pulsed signal source 26 to control one or more switching devices within the switching converter 16. The pulsed signal source 26 generates a pulsed signal having a duty cycle which varies in dependence upon the voltage at the first output 22. The duty cycle is modified to increase the offset voltage when the voltage at the first output 22 drops below the desired DC voltage level, and to decrease the offset voltage when the voltage at the first output 22 rises above the desired DC voltage level. The pulsed signal source 26 can be formed using a commercially-available integrated circuit configured as a pulse width modulator.

Hence, the step-up power converter 10 in accordance with the present invention processes (using the switching converter 16) only a part of the input power to achieve a desired output voltage and current. In particular, the switching converter 16 in the step-up power converter 10 uses only part of the power from the input signal needed to generate the difference between the input voltage and the desired output voltage. By processing less power, the step-up power converter 10 is more efficient, can be made smaller, and is less expensive than previous step-up power converters.

Figure 2:
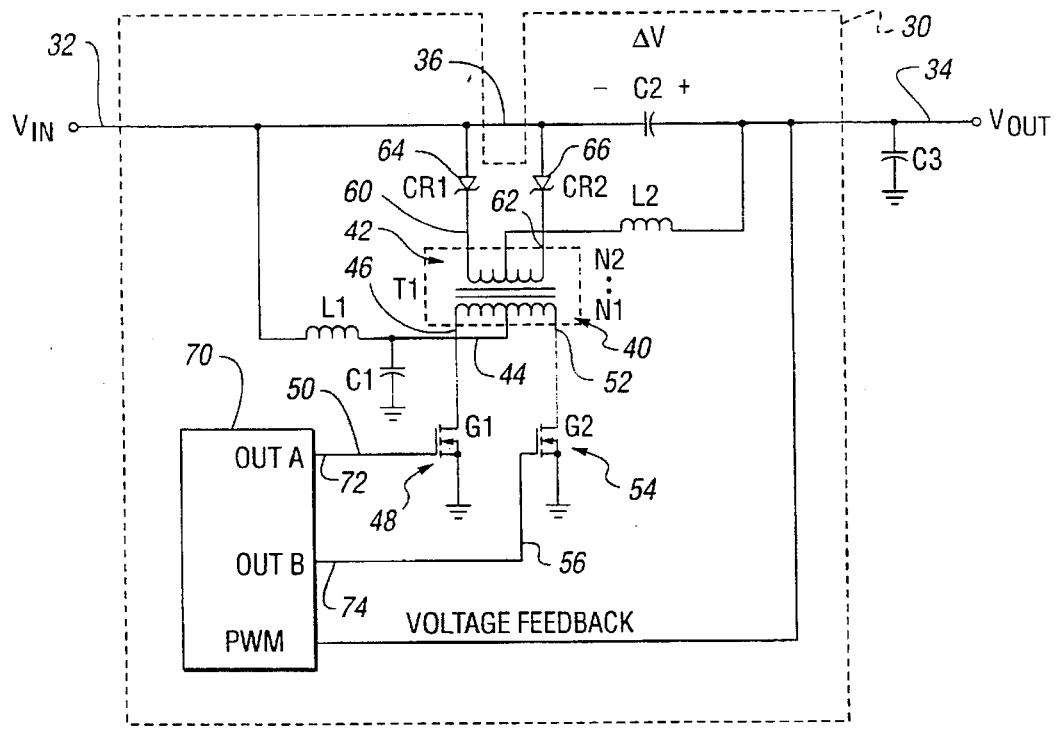
FIG. 2 is a schematic diagram of an embodiment of the step-up power converter in accordance with the present invention.

Turning now to FIG. 2, there is shown a schematic diagram of an embodiment of the step-up power converter in accordance with the present invention.

The power converter includes a switching converter 30 having an input 32 which receives an input signal VIN. The switching converter 30 has a differential output comprising a first output 34 and a second output 36. A transformer T1 is included to isolate the input 32 from the differential output. The transformer T1 includes a first winding 40 which is coupled to the input 32, and a second winding 42 which is coupled to the differential output.

In the embodiment of FIG. 2, the switching converter 30 includes a push-pull converter. The push-pull converter topology is preferred for its ability to handle large input voltage swings. Here, the input 32 is coupled to a center tap 44 of the first winding 40 of the transformer T1. The input 32 is coupled to the center tap 44 by an energy storage network comprised of inductor L1 and capacitor C1. Specifically, the inductor L1 is coupled between the input 32 and the center tap 44, and the capacitor C1 is coupled between the center tap 44 and ground.

The first winding 40 of the transformer T1 has a first terminal 46 coupled to a first switching device 48. The first switching device 48 selectively couples and uncouples the first terminal 46 to ground based upon a first control signal received at a control input 50. As illustrated in FIG. 2, the first switching device 48 can comprise a MOSFET (metal oxide semiconductor field effect transistor) having a drain connected to the first terminal 46, and a source connected to ground. The substrate, i.e. the body of the MOSFET is directly connected to the source. The gate of the MOSFET acts as the control input 50.

The first winding 40 of the transformer T1 includes a second terminal 52 which is selectively coupled and uncoupled to ground by a second switching device 54. The second terminal 52 is selectively coupled and uncoupled to ground based upon a control signal received at a control input 56. In the embodiment of FIG. 2, the second switching device 54 includes a MOSFET having a drain coupled to the second terminal 52, and a source coupled to ground. The substrate of MOSFET is connected to the source, and the gate acts as the control input 56.

Although illustrated in terms of MOSFETs, it should be understood that the first switching device 48 and the second switching device 54 can be embodied by other types of switching devices known in the art.

The second winding 42 of the transformer T1 includes a first terminal 60 and a second terminal 62. The first terminal 60 is coupled to the second output 36 by a rectifying element 64. The rectifying element 64 can be embodied by a Schottky diode CR1 having an anode connected to the second output 36 and a cathode connected to the first terminal 60.

In a similar manner, the second terminal 62 is coupled to the second output 36 by a rectifying element 66. The rectifying element 66 can be embodied by a Schottky diode CR2 having an anode connected to the second output 36 and a cathode connected to the second terminal 62. It is noted that the rectifying elements 64 and 66 are not limited to Schottky diodes, and as such, other types of rectifying elements known in the art may be employed in embodiments of the present invention.

The second winding 42 includes a center tap 68 which is coupled to the first output 34 by an inductor L2. A capacitor C2 is coupled between the first output 34 and the second output 36 to smooth the output voltage produced at the differential output.

The first output 34 is coupled to an input line of a pulse width modulator 70. The pulse width modulator 70 alternately produces pulses along a first output line 72 and a second output line 74. The pulses are produced at a fixed frequency, but have a pulse width which is modulated based upon the voltage at the first output 34. The first output line 72 is connected to the control input 50 of the first switching device 48. The second output line 74 is connected to the control input 56 of the second switching device 54. The feedback loop formed by these connections is used to regulate the voltage VOUT produced at the first output 34.

The input line 32 is directly connected to the second output 36 of the switching converter 30. As a result, the switching converter 30 is utilized to supply power to make up the difference between the desired output voltage VOUT and the input voltage VIN. As a result, the power supplied by the switching converter 30 is the difference between VOUT and VIN multiplied by a load current. To further stabilize the output voltage, a capacitor C3 is coupled between the first output line 34 and ground.

To illustrate the improved efficiency of the present invention, consider a situation where a 50 volt bus voltage is to be stepped up to a 65 volt output voltage. For a three-amp load current, the power loss exhibited by a 92% efficient boost converter is approximately 17 watts. In comparison, an embodiment of the present invention having a 92% efficient switching converter has a power loss of only 3.9 watts, since only 45 watts of power ((65 V–50 V)*3 A=45 W) is processed by the switching converter. The overall efficiency for this embodiment of the present invention is approximately 98%, or a 6% improvement from the boost converter.

For optimum performance, the transformer T1 is designed for 0% to 100% duty cycle operation. Under low bus operation, the switching converter processes maximum power and operates near to 100% duty cycle. At high bus operation, the switching converter processes minimum power and operates close to 0% duty cycle.

Figure 3:
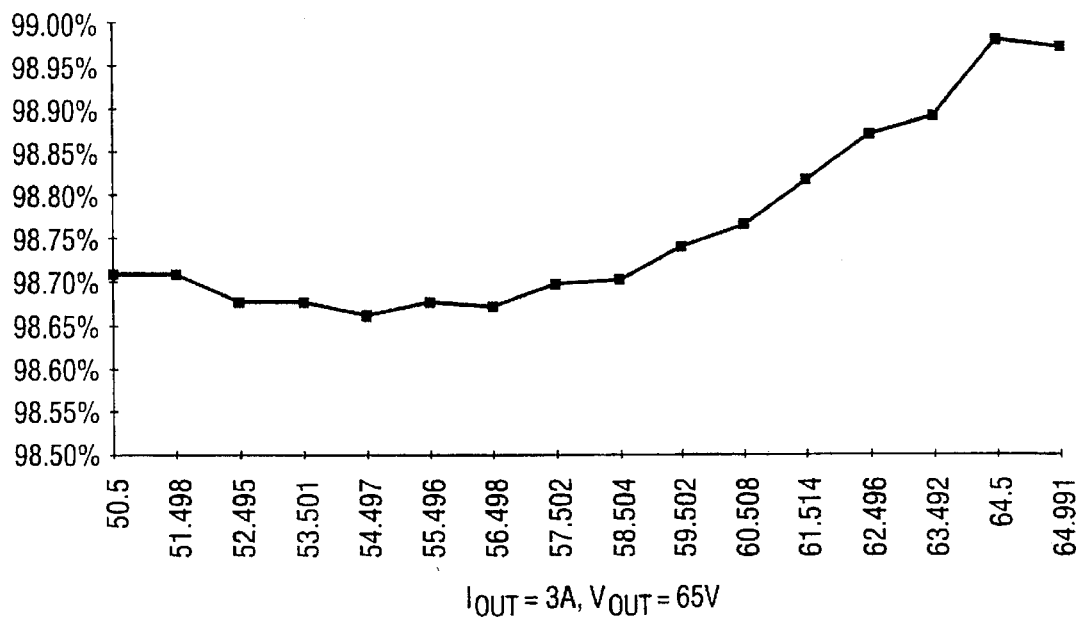
FIG. 3 is a graph of efficiency versus input voltage level for an embodiment of the step-up power converter.

Turning now to FIG. 3, there is shown a graph of experimental efficiency versus input voltage data for an embodiment of the power converter. As illustrated in the graph, the efficiency of the power converter is maintained above approximately 98.67% for input voltages ranging from 50.5 volts to approximately 65 volts.

Figure 4:
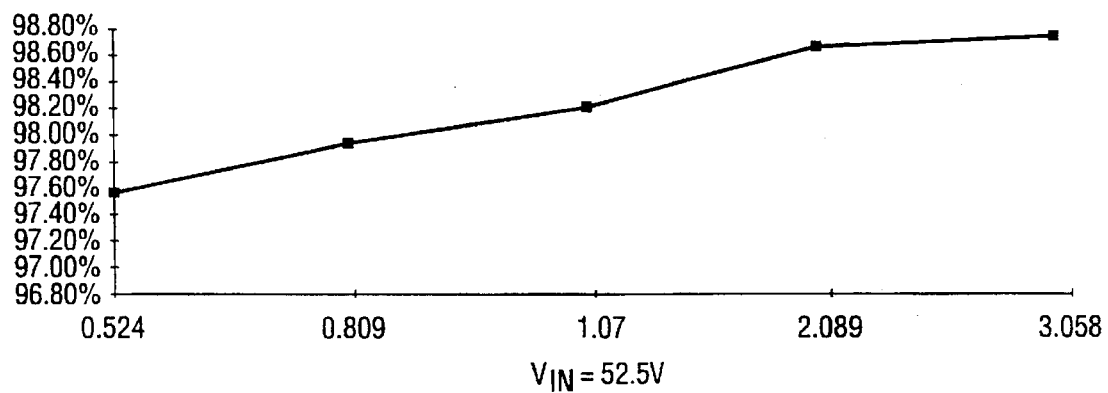
FIG. 4 is a graph of efficiency versus output current for an embodiment of the step-up power converter.

FIG. 4 is a graph of experimental efficiency versus output current data for an embodiment of the power converter. For a fixed input voltage of 52.5 volts, the efficiency is greater than 97.6% for output current levels between 0.524 amps and 3.058 amps.

The above-described embodiments of the present invention have many advantages. By processing only the difference between the input voltage and the desired output voltage, the switching converter of the present invention exhibits an improved efficiency over a wide range of input voltage levels. By processing less power, the power converter of the present invention can be made smaller and less expensive. For example, the total mass of the power converter used to generate the experimental data of FIGS. 3 and 4 is less than 200 grams.

It is noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A power converter for converting an input signal having a first DC voltage level to an output signal having a second DC voltage level, the power converter comprising:

a switching converter having an input which receives the input signal and a floating differential output which includes a first output and a second output, the switching converter operative to convert the input signal to an offset voltage equal to a difference between the second DC voltage level and the first DC voltage level, the offset voltage being generated across the first output and the second output of the floating differential output;

wherein the input signal is applied to the second output of the floating differential output to sum the first DC voltage level with the offset voltage and thereby produce the output signal at the first output.

2. The power converter of claim 1 wherein the switching converter includes a push-pull converter.

3. The power converter of claim 1 wherein the switching converter includes a transformer to isolate the input from the differential output.

4. The power converter of claim 3 wherein the transformer includes a first winding and a second winding, the first winding coupled to the input of the switching converter, the second winding coupled to the differential output of the switching converter.

5. The power converter of claim 4 wherein the second winding includes a first terminal, a second terminal, and a center tap, wherein the first terminal and the second terminal are coupled to one output of the first output and the second output, and wherein the center tap is coupled to another output of the first output and the second output.

6. The power converter of claim 5 wherein the first terminal is coupled to the one output by a first rectifying element, and wherein the second terminal is coupled to the one output by a second rectifying element.

7. The power converter of claim 1 further comprising a pulsed signal source which generates a pulsed signal having a duty cycle which varies in dependence upon the voltage of the first output, the pulsed signal utilized to control at least one switching device in the switching converter, wherein the duty cycle is varied to increase the offset voltage when the voltage at the first output drops below the second DC voltage level, and to decrease the offset voltage when the voltage at the first output rises above the second DC voltage level.

8. A method of converting an input signal having a first DC voltage level to an output signal having a second DC voltage level, the method comprising the steps of:

providing a switching converter having an input which receives the input signal and a floating differential output which includes a first output and a second output;

converting the input signal, using the switching converter, to an offset voltage equal to a difference between the second DC voltage level and the first DC voltage level, the offset voltage being generated across the first output and the second output of the floating differential output; and applying the input signal to the second output of the floating differential output to sum the first DC voltage level with the offset voltage and thereby produce the output signal at the first output.

9. The method of claim 8 wherein the switching converter includes a push-pull converter.

10. The method of claim 9 wherein the switching converter includes a transformer to isolate the input from the differential output.

11. The method of claim 10 wherein the transformer includes a first winding and a second winding, the first winding coupled to the input of the switching converter, the second winding coupled to the differential output of the switching converter.

12. The method of claim 11 wherein the second winding includes a first terminal, a second terminal, and a center tap, wherein the first terminal and the second terminal are coupled to one output of the first output and the second output, and wherein the center tap is coupled to another output of the first output and the second output.

13. The method of claim 12 wherein the first terminal is coupled to the one output by a first rectifying element, and wherein the second terminal is coupled to the one output by a second rectifying element.

14. The method of claim 8 further comprising the steps of:

generating a pulsed signal having a duty cycle which varies in dependence upon the voltage of the first output; and controlling at least one switching device in the switching converter based on the pulsed signal;

wherein the duty cycle is varied to increase the offset voltage when the voltage at the first output drops below the second DC voltage level, and to decrease the offset voltage when the voltage at the first output rises above the second DC voltage level.

* * * * *